United States Patent [19]

Ruhl

[11] 4,293,844
[45] Oct. 6, 1981

[54] VARIABLE ACCELERATION MONITORING SYSTEM

[76] Inventor: Hermann Ruhl, 30 Queen Elizabeth Blvd., Etobicoke, Ontario, Canada

[21] Appl. No.: 144,889

[22] Filed: Apr. 29, 1980

[51] Int. Cl.³ ............................................. G08B 21/00
[52] U.S. Cl. .................................. 340/52 R; 340/53; 340/669; 180/282
[58] Field of Search ................ 340/52 R, 53, 62, 669, 340/670; 180/271, 277, 282, 283

[56] References Cited
U.S. PATENT DOCUMENTS

| | | | |
|---|---|---|---|
| 3,794,972 | 2/1972 | Van Ostrom | 340/669 |
| 3,805,089 | 4/1974 | Rau et al. | 340/669 |
| 4,093,939 | 6/1978 | Mitchell | 340/669 |

Primary Examiner—Alvin H. Waring

[57] ABSTRACT

The present invention provides an acceleration warning and control system for use on motor driven vehicles. The system comprises speed measuring means, acceleration means and an acceleration warning switch, having a variable switch point. Accordingly, the acceleration warning switch is set to switch at different accelerations for different speeds. Generally, the system allows for a higher acceleration at low speeds relative to the acceleration for higher speeds.

14 Claims, 2 Drawing Figures

VARIABLE ACCELERATION MONITORING SYSTEM

FIELD OF THE INVENTION

The present invention relates to an acceleration warning and/or control system having an acceleration warning switch which is operated by different rates of acceleration at different vehicle speeds.

BACKGROUND OF THE INVENTION

In view of the increasing costs of operating motor driven vehicles and more particularly, the increasing fuel costs for running these vehicles, many fuel conservation programs have been initiated. One of the main ways to conserve on fuel consumption, as well as wear and tear on the vehicle, is to limit the rate of both acceleration and deceleration. To date, a number of acceleration warning systems have been devised. However, improvements can be made to these systems.

One design of an acceleration warning system is shown and described in U.S. Pat. No. 4,171,030 issued Oct. 16, 1979 to Hermann Ruhl. The system in this U.S. Patent is one in which a control or warning device is activated by undesirably high rates of vehicle acceleration, either in the positive or the negative sense, i.e. acceleration or deceleration. However, one of the drawbacks of this patented system as well as other presently available systems is that they are set to operate at a fixed acceleration rate regardless of the vehicle's speed and do not take into account, that certain rates of acceleration may be desirable at one speed while being undesirable at a different speed.

Observations of the acceleration patterns in traffic show that vehicles tend to accelerate relatively fast at low driving speeds and much more slowly at higher driving speeds. Generally speaking, the acceleration rate decreases with increasing driving speed, which is fully understandable in view of the fact that at low speeds, a relatively high acceleration can be achieved with a relatively lower engine power than is required at higher speeds. Therefore, the higher the driving speed, the more power required to keep the vehicle moving at a steady speed, so that less power is available for additional acceleration. Additionally, it is possible to accelerate at a faster rate at low speeds with a relatively low fuel consumption since less power is required to accelerate at low speeds than at higher speeds. This means that higher accelerations at lower driving speeds are not as fuel consuming as accelerations at higher driving speeds. Furthermore, with increasing driving speeds the driver becomes more aware of a higher noise level from the moving vehicle and from the engine, indicating to the driver that higher power is required to accelerate the vehicle at these higher speeds. The fact that more power is required for acceleration at higher speeds, is also indicated by the accelerator pedal position which must be depressed considerably farther than is required at lower driving speeds.

Acceleration warning systems as described in U.S. Pat. No. 4,171,030 which are limited in that they react to a fixed acceleration rate regardless of speed, will not meet the actual conditions of traffic and therefore, do not reflect the patterns of acceleration in speed selection which would be chosen by an experienced well-trained driver. These limited warning device systems do not permit control of the vehicle in a manner corresponding to the natural pattern of acceleration rates which are acceptable and found in general traffic patterns.

It would not be feasible to provide an acceleration warning system with a rate of acceleration control set to operate at a medium acceleration rate between slow and high speeds. Such a setting would have the effect that at slower driving speeds, the desirable acceleration rate could still not be achieved because the warning would occur at a rate something below that accepted at slow speeds, while at higher speeds over accelerating would be permitted before the warning could be activated.

The present invention provides an acceleration monitoring system which operates more efficiently than any of the systems described above. The system of the present invention which can be used as a warning and/or control system, is adapted to react to different acceleration rates at different speeds traveled by the vehicle. More particularly, the acceleration monitoring system for motor driven vehicles of the present invention has, in combination, speed measuring means providing an output signal proportionate to and changing with the speed of the vehicle, acceleration measuring means providing an output signal corresponding to the output signal from the speed measuring means, acceleration warning switch means having a variable switch point for switching at different predetermined rates of acceleration, speed sensing means controlling the switch means and changing the switch point according to the predetermined rates of acceleration in relation to speed, and monitoring means in the form of a control or warning device activated by the switch means which is responsive to the output signal from the acceleration measuring means.

It will be understood from the description above, that the acceleration monitoring system of the present invention is one which is adapted to meet every day driving demands for natural traffic flows.

BRIEF DISCUSSION OF THE DRAWINGS

The above, as well as other features and advantages of the present invention will be described in greater detail having reference to the preferred embodiments of the present invention wherein.

DETAILED DESCRIPTION ACCORDING TO THE PREFERRED EMBODIMENTS OF THE PRESENT INVENTION

Figure 1:
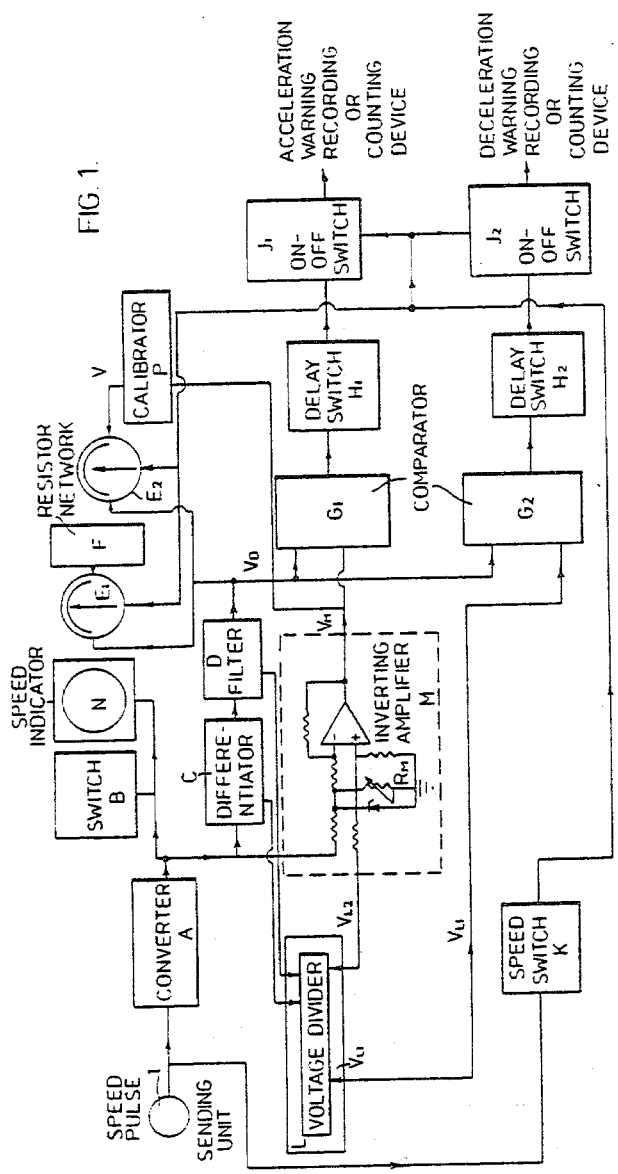
FIG. 1 is a schematic showing generally, in block form the preferred components used in providing the acceleration monitoring system of the present invention.
Figure 2:
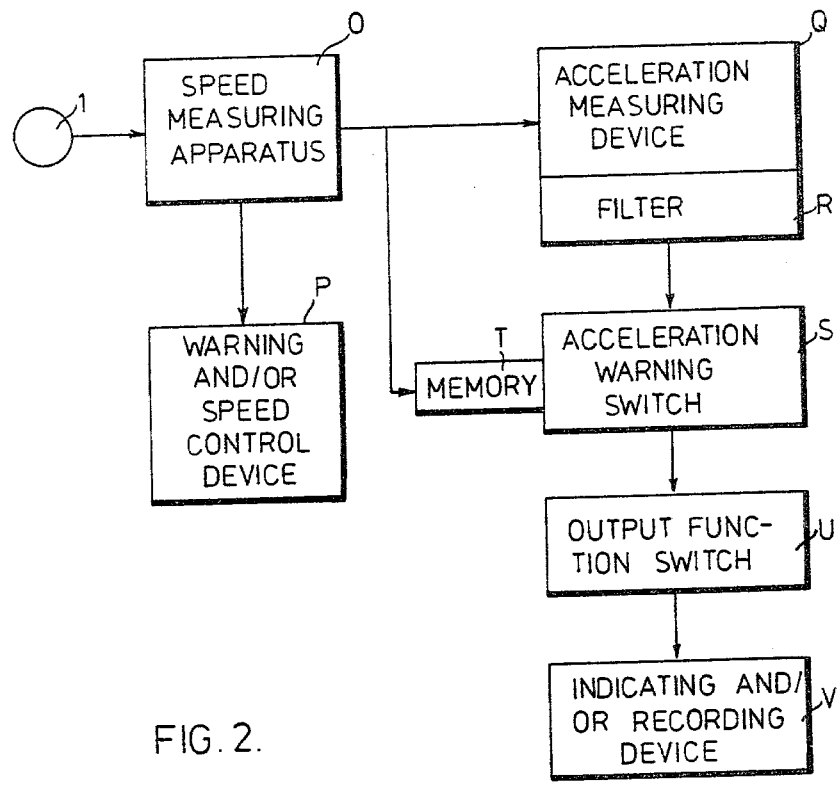
FIG. 2 is a second schematic view showing a slight modification to the system of FIG. 1.

It is to be understood that the acceleration monitoring system of the present invention can either be analogue or digitally operated. FIG. 1 shows primarily an analogue circuit whereas FIG. 2 shows a digital representation of the system used in a preferred embodiment of the present invention. The system of FIG. 2 could of course, incorporate a microprocessor as a control unit for the system.

Referring now to FIG. 1, a speed pulse sending unit 1, sends speed pulses to a frequency to voltage converter A. These speed pulses can be generated in a number of different manners such as by recording wheel and/or axle rotation and generating pulses in accordance with such rotation.

A voltage corresponding to the speed, as determined by the frequency of the pulses is developed in the frequency to voltage converter and thereafter, fed to a speed warning switch shown at B. This speed warning switch may be set up to activate audible or visible warning signals or even a speed limiting or speed governing device.

The output voltage of converter A which corresponds to the momentary speed of the vehicle is also fed into an acceleration measuring amplifier or differentiator C. The output from the differentiator is in the form of a reference voltage, indicative of and changing with, the acceleration rate. This output voltage from differentiator C is filtered in a filter D which eliminates spurious signals and excessive acceleration signals created by vibrations, shocks, etc., of the vehicle.

The filtered output of filter D is connected to a pair of meters E1 and E2. As the result of the filtering in filter E, these meters only receive signals indicative of true acceleration so that they do not record outside factors such as those mentioned above.

Meter E1 provides a reading representing absolute acceleration of the vehicle. This meter reads 0 in the center of its scale. In order to have 0 voltage at meter E1, a compensating voltage from a resistor network F is connected to the other meter lead. The compensating voltage is selected to be equal to the reference voltage supplied to meter E from block D at conditions of steady speed without acceleration. The acceleration of the vehicle either in a positive or a negative sense, i.e., acceleration or deceleration, therefore, moves the needle off the center of the scale.

Meter E2 on the other hand, is used to indicate whether and to what extent the momentary acceleration is below, equal to or higher than the permitted acceleration rate at the speed the vehicle is at any moment. It serves as an evaluator of the acceleration rate and as a guideance to the driver to increase or decrease the acceleration. This effect is achieved by using a meter with a pointer in a center position, for instance, vertically upwards, when two input voltages are identical, one of the inputs is connected to the voltage from block D representing the actual acceleration and the other to the voltage from inverting amplifier M representing the momentary allowable acceleration rate according to the speed.

Meter E2 will therefore; by its indication to the left or right from the center, indicate to what extent the actual acceleration is higher or lower than the permitted maximum one. Meter E2 can also be hooked up to the acceleration limiting controls to actuate these controls at excessive acceleration rates.

The output of voltage of block D is also fed into an acceleration comparator G1 and a deceleration comparator G2. These comparators each provide an output signal, if either the acceleration or deceleration exceeds a preset value. The switching of G1 will only occur if the output voltage VD of block D exceeds a reference voltage VM at steady speed by a preset value. Reference voltage VM is the output from an inverting amplifier M which will be described later in greater detail.

The switching of the deceleration comparator G2 will only occur if the output voltage VD of block D falls below the reference voltage VL1 at steady speed by a preset amount. Reference voltage VL1 is produced in a voltage divider network L which will also be described later, in greater detail.

The output signals of comparators G1 and G2 are fed into delay switches, H1 and H2 respectively. These delay switches switch immediately on upon receiving output signals from the comparators but only switch off after a preselected short time span following the termination of the signals from the comparators. The result of this arrangement is that repeated on-off output signals of G1 and G2 occuring within this short preselected time span, will not cause additional on-off output signals from the switches from the switches H1 and H2.

The thusly controlled outputs of switches H1 and H2 are connected to on-off switches J1 and J2. These latter switches are connected to and are controlled by a minimum speed switch A. According to this arrangement, any signal from on-off switches J1 and J2 into warning recording or signal counting devices used in conjunction with the system will only be provided if the preset minimum speed in speed switch K is reached or exceeded. Accordingly, the system may be set up such that the vehicle has be travelling at a minimum of for instance 5 to 10 miles an hour before the system can be operated. A more detailed discussion of the effect of speed switch K can be found in U.S. Pat. No. 4,171,030 mentioned above. For recording purposes, the output of speed switch K is also connected to meters E1 and E2 inhibiting operation of these meters at the low initial speeds of the vehicle.

In order to provide changing of the switch point of devices J1 and J2, so that they react to different accelerations at different speeds and more particularly, reduced acceleration at higher speeds, a voltage divider network L is set up to provide a voltage output which is fed in the case of the positive acceleration switch as VL2 into an inverting amplifier M which determines an output voltage VM providing a control signal into the acceleration comparator G1. At the same time, the speed voltage output from converter A, is fed as a control voltage into the inverting amplifier M and effectively decreases the output voltage of M with increasing speed. This in turn, decreases the switch point level of acceleration comparator G1 as the speed of the vehicle is increased, so that at higher speeds, a relatively lower acceleration rate is required for switching of comparator G1.

In the event that the vehicle operator wants to reset the switch points for the acceleration warning switches, he can do so by changing the value of resistor RM in the inverting amplifier M. The level of the switch points can either be increased or decreased to suit the desired reduction of acceleration with increasing speed.

Means may also be provided to the inverting amplifier M to limit the voltage reduction to a preset level, thereby preventing the rate of acceleration in which the warning occurs to drop below a desired preset rate.

With respect to deceleration, the system shown in the drawings is one in which the warning switch is activated at a fixed unacceptable rate of deceleration regardless of the vehicle's speed. The reference voltage VL1 for the deceleration comparator G2 is taken directly out of the voltage divider network and fed into the deceleration comparator and, depending upon the selection of this reference voltage, the deceleration comparator will provide an output signal at a higher or lower deceleration rate.

It is to be appreciated that deceleration comparator $G_2$ could be set up in a similar manner to the acceleration comparator so as to have a varying switch point, dependent upon the speed of the vehicle.

To complete the system, the reference voltage, from converter A representing the vehicle's speed, may be fed into a signal conditioning device N which conditions this signal so that it is suitable for feeding into a speed indicator N such as a speedometer or the like, for the driver, visually showing the speed of the vehicle. The output of converter A can also be fed into a speed recording device where the speed of the vehicle is recorded.

The system shown in FIG. 2, performs the same function as the analogue system shown in FIG. 1 but operates on a digital basis using for instance, a microprocessing unit for moving the switch point of the monitoring system with the speed of the vehicle.

The system of FIG. 2 again, uses a speed pulse sending unit 1 sending speed pulses, the frequency of which are determined by the vehicle's speed to a speed measuring apparatus O. The signal output of the speed measuring apparatus is sent to an acceleration measuring device Q, which measures the vehicle's rate of acceleration. The output from the speed measuring apparatus may also be sent to a warning and/or speed control device P having either a visual or an audible warning signal telling the driver that he is travelling at an excessive speed. The speed control device P may also be in the form of a governor to limit the speed travelled by the vehicle.

The output from the acceleration measuring device Q is filtered through a filter R to eliminate any spurious signals representing outside influences, such as road roughness or speedometer cable reactions not indicative of true acceleration.

The digital signal from filter R is then sent into an acceleration warning switch S. The switch may be as mentioned above, in the form of a microprocessor and is provided with a memory T having an input signal directly from the speed measuring apparatus. This memory is preprogramed to activate the acceleration warning switch when the rate of acceleration at that particular vehicle's speed reaches an unacceptable level. The output from the acceleration warning switch is then fed into an output function switch U which operates some type of an acceleration warning or control apparatus for limiting the acceleration rate of the vehicle. The signal output from the function switch U is also fed into an indicating and/or recording device T for indicating the acceleration rate to the driver or for recording the unacceptable rates of vehicle acceleration.

Although various preferred embodiments of the invention have been described herein in detail, it will be appreciated by one skilled in the art, that variations may be made thereto, without departing from the spirit of the invention or the scope of the appended claims.

The embodiments of the invention in which an exclusive property or privilege is claimed are defined as follows:

1. An acceleration monitoring system for monitoring the rate of acceleration of a motor driven vehicle, said system comprising in combination, speed measuring means providing an outout signal proportionate to and changing with the speed of the vehicle; acceleration measuring means providing an output signal corresponding to rate of change of the output signal from said speed measuring means; acceleration warning switch means with a variable switch point for switching at predetermined rates of acceleration; speed sensing means controlling the switch means and changing the switch point according to the predetermined rates of acceleration in relation to speed, said switch means being responsive to the output signal from said acceleration measuring means and monitoring means activated by said switch means.

2. An acceleration monitoring system as claimed in claim 1 having speed depending signal generating means, providing input to the variable acceleration warning switch means and changing the switch point of the switch means to decreasing acceleration rates with increasing speeds.

3. An acceleration monitoring system as claimed in claim 2 wherein said speed depending signal generating means provides an input voltage to the variable switch means.

4. An acceleration monitoring system as claimed in claim 2 wherein said speed depending signal generating means provides a digital speed value as the input to the variable switch means, said variable switch means having a memory to determine the acceleration rate for the switch point according to the speed.

5. An acceleration monitoring system as claimed in claim 3 providing voltage limiting means to the input of the variable acceleration warning switch means to assure a minimum voltage input to the variable acceleration warning switch means, thereby preventing the switch point from dropping below a preselected minimum acceleration with increasing speed.

6. An acceleration monitoring system as claimed in claim 1 including warning indicating recording means activated by additional output function switch means providing a signal which within a preset time span provides a single output signal independent of on/off switching of the acceleration warning switch means within said preset time span.

7. An acceleration monitoring system as claimed in claim 1 including delayed off switching means activated by said acceleration means and maintaining the output signal to said monitoring means for a predetermined time span after being deactivated to avoid multiple output signals to said monitoring means for a predetermined time span after being deactivated to avoid multiple output signals to said monitoring means resulting from short cycle inputs from the acceleration warning switch means.

8. Acceleration monitoring system as claimed in claim 1 having acceleration measuring circuitry with preselected minimum acceleration signal time span to eliminate monitoring means activating signals resulting from insignificant short term acceleration and signal faults of the speed measuring means.

9. An acceleration monitoring system as claimed in claim 1 having a speed indicating output for controlling a speed indicating device.

10. An acceleration monitoring system as claimed in claim 1 having a speed warning switch activated by the speed measuring means.

11. An acceleration monitoring system as claimed in claim 1 wherein said monitoring means comprises control apparatus for controlling the rate of acceleration of the vehicle.

12. An acceleration monitoring system as claimed in claim 1 wherein said monitoring means comprises warning apparatus for warning when the rate of acceleration of the vehicle reaches an unacceptable level to limit the voltage reduction to a preset level, thereby, preventing the rate of acceleration at which the warning occurs to drop below a desired preset rate.

13. An acceleration monitoring system as claimed in claim 1 having means for generating acceleration depending signals, means for generating speed depending acceleration limit indicating signals, these two signals influencing differential value measuring means which indicate the extent of difference between actual acceleration and permitted maximum acceleration at various speed levels.

14. An acceleration monitoring system as claimed in claim 13 in which the differential value measuring means actuate controls to keep the rate of the actual acceleration equal to the permitted rate of acceleration for given speeds.

* * * * *